(12) United States Patent
Kiss et al.

(10) Patent No.: US 9,391,820 B2
(45) Date of Patent: Jul. 12, 2016

(54) RAILWAY CODE GENERATION AND SIGNALING SYSTEM AND METHOD

(71) Applicant: Altsom Transport Technologies, Saint-Ouen (FR)

(72) Inventors: James Michael Kiss, Melbourne, FL (US); Steven Ray Murphy, Melbourne, FL (US)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 0 days.

(21) Appl. No.: 14/066,884

(22) Filed: Oct. 30, 2013

(65) Prior Publication Data

US 2014/0119414 A1    May 1, 2014

Related U.S. Application Data

(60) Provisional application No. 61/721,116, filed on Nov. 1, 2012.

(51) Int. Cl.
*H04L 25/49* (2006.01)
*B61L 1/18* (2006.01)
*B61L 23/16* (2006.01)

(52) U.S. Cl.
CPC ............ *H04L 25/4908* (2013.01); *B61L 1/185* (2013.01); *B61L 1/188* (2013.01); *B61L 23/163* (2013.01); *B61L 23/168* (2013.01)

(58) Field of Classification Search
CPC ....... B61L 1/185; B61L 1/188; B61L 23/163; B61L 23/168
See application file for complete search history.

(56) References Cited

U.S. PATENT DOCUMENTS

| | | | |
|---|---|---|---|
| 2,650,295 A | 8/1953 | Reichard |
| 2,662,971 A | 12/1953 | Howard |
| 4,498,650 A | 2/1985 | Smith et al. |
| 4,619,425 A | 10/1986 | Nagel |
| 5,145,131 A | 9/1992 | Franke |

(Continued)

FOREIGN PATENT DOCUMENTS

EP    2090491 B1    8/2011

OTHER PUBLICATIONS

Yong et al., "A Novel Digital Coded Track Signal-ITRS Based on TVM430", IEEE 72nd Vehicular Technology Conference Fall (VTC 2010-Fall), pp. 1-5, Sep. 6-9, 2010.
GE Transportation Systems Global Signaling, LLC, ElectroLogIXS VLC and EC5, pp. 1-10 to 1-19, dated 2012.

*Primary Examiner* — Todd Melton
(74) *Attorney, Agent, or Firm* — Knobbe Martens Olson & Bear LLP (57) ABSTRACT

A first unit configured to generate and transmit a code of positive and negative DC pulses through a first rail of a railway. A second unit spaced from the first unit and configured to sense the code, which includes a leading code word, having a positive or negative timing pulse followed after a first data interval by a positive or negative data pulse, followed by a modifying code word. The modifying code word consists of a second positive or negative timing pulse followed after a second data interval by a second positive or negative data pulse. The second timing pulse starts after one code cycle from the start of the leading code word timing pulse. The second timing pulse and the second data pulse duplicate the timing pulse and the data pulse of the same polarity, but invert the timing pulse and the data pulse of opposite polarities.

12 Claims, 4 Drawing Sheets

(56) References Cited

U.S. PATENT DOCUMENTS

| | | | |
|---|---|---|---|
| 5,271,584 A * | 12/1993 | Hochman et al. | 246/34 B |
| 5,448,142 A | 9/1995 | Severson et al. | |
| 7,245,993 B2 * | 7/2007 | Wilms | 701/19 |
| 7,623,567 B2 | 11/2009 | Wilms | |
| 8,292,237 B1 | 10/2012 | Ireland | |
| 8,296,065 B2 | 10/2012 | Haynie et al. | |
| 2012/0232813 A1 | 9/2012 | Lawson et al. | |

* cited by examiner

PRIOR ART

RAILWAY CODE GENERATION AND SIGNALING SYSTEM AND METHOD

CROSS REFERENCE TO RELATED APPLICATIONS

This application claims the benefit of provisional U.S. App. No. 61/721,116, "RAILWAY CODE GENERATION AND SIGNALING SYSTEM AND METHOD," filed Nov. 1, 2012, which is hereby incorporated by reference in its entirety.

FIELD OF THE INVENTION

Embodiments of the invention relate generally to railroads. Other embodiments relate to code generation for railroad track circuits.

BACKGROUND OF THE INVENTION

A railway is a mode of transportation limited to one degree of freedom, meaning that a rail vehicle may only travel back and forth along a track and, absent the presence of a switch to change tracks, cannot alter its path to avoid other traffic. In order to prevent rail vehicles on the same track from running into one another, a block signaling scheme has been utilized whereby the track is divided into segments or "blocks." Typically, wayside indicators placed before an upcoming block indicate to the locomotive operator whether or not an upcoming block is occupied by another rail vehicle, so that the speed of the operator's rail vehicle can be adjusted to avoid any potential interference between rail vehicles.

Railway signaling, such as to indicate a condition (e.g., the presence of a broken rail) or occupancy of a track block, has been traditionally controlled by a track circuit. The track circuit is essentially an electrical circuit in which the rails within a block provide electrical connection between an electrical signal transmitter and an electrical signal receiver. Electrical separation between adjacent blocks may be provided by insulating joints. The transmitter, such as a voltage source, impresses an electrical signal into the rails at one end of the block which may be received by a receiver, such as a relay, at the other end of the block. The relay can then operate to display an appropriate aspect on the wayside indicator.

Existing track circuit systems also provide means for coding the electrical signal to transmit and receive information through the rails of the track, as well as track occupancy detection by the shunting action of the wheels of the rail vehicle. These systems provide block occupancy information at both ends of the track circuit, as well as communicating occupancy in general through several track sections to a control point where the information may be transmitted to a central office for display.

In particular, codes are used to transmit information to a wayside signal. Typically, vital track codes are generated using one or more short, positive DC pulses on a DC circuit. The pulses are typically 80 to 250 milliseconds in duration with the pulses of multiple-pulse bursts being separated by brief intervals, on the order of 80 to 950 milliseconds.

Figure 1:
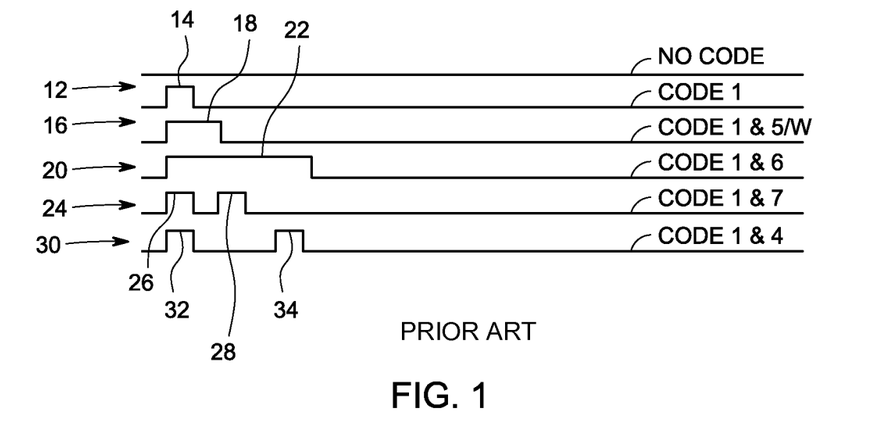
FIG. 1 illustrates a prior art ("legacy") coding scheme featuring positive DC pulses on a DC track circuit.

With reference to FIG. 1, current coding schemes rely on a series of accurately timed, single direction, positive pulses on a DC track circuit. These pulses are generated by a transmitter at one end of a block, and are evaluated by a receiver at the other end of the block for timing to determine the particular code being transmitted. Adjacent blocks reverse the polarity of the track circuit connections so the entire coded signal is the reverse polarity, thereby enabling receivers to discriminate signals within their track block from signals in an adjacent track block.

Thus, with existing coding schemes, information is conveyed by pulse and separation widths. As shown in FIG. 1, for example, a first code 12 is defined by a single, short, positive DC pulse 14. A second code 16 is defined by a single, positive DC pulse 18 of slightly longer duration. A third code 20 is defined by a single, positive DC pulse of longer duration 22. As also shown therein, codes may also include multiple pulses. For example, a fourth code 24 may be defined by two short, positive DC pulses 26, 28 in quick succession, and a fifth code 30 may be defined by two short, positive DC pulses 32, 34 that have a longer time interval therebetween. As will be readily appreciated, however, existing coding schemes that convey information by pulse and separation widths are limited in the number of codes that that can communicate information within a defined code cycle.

As rail vehicle control has evolved, a need for additional information, such as speed restrictions or track conditions ahead, has grown. However, utilizing existing code generation and signaling systems and methods, the number of codes that can safely communicate information without making the code window longer, which would change the cycle time and delay detection and the relaying of data, is less than the number of conditions to be communicated.

BRIEF DESCRIPTION OF THE INVENTION

An embodiment of the present invention relates to a system (e.g., for electrically communicating a condition relating to a railway). The system comprises a first unit configured for connection to at least one rail of a railway and configured to generate and transmit a code of positive and negative DC pulses through the at least one rail, for reception by a spaced-apart second unit connected to the at least one rail. The code transmitted by the first unit includes a leading code word followed by a modifying code word. The leading code word comprises a first positive or negative timing pulse followed after a first data interval by a first positive or negative data pulse. The modifying code word comprises a second positive or negative timing pulse followed after a second data interval by a second positive or negative data pulse. The second positive or negative timing pulse starts after a time delay of one code cycle from the start of the first timing pulse of the leading code word. The second timing pulse and the second data pulse are duplicates of the first timing pulse and the first data pulse in case the first timing pulse and the first data pulse are of a same polarity, but are inverts of the first timing pulse and the first data pulse in case the first timing pulse and the first data pulse are of an opposite polarity.

In another embodiment, a system comprises a first unit configured for connection to at least one rail of a railway and further configured to transmit through the at least one rail a leading code word of an electrical signal. The leading code word of the electrical signal includes both positive and negative DC pulses. The first unit is further configured, after a time interval of one code cycle, to transmit through the at least one rail a modifying code word of the electrical signal. The modifying code word of the electrical signal includes a sequence of DC pulses that invert the polarities of the DC pulses in the leading code word. The system further comprises a second unit configured for connection to the at least one rail and further configured to receive the electrical signal, confirm that the modifying code word of the signal inverts the polarities of the leading code word, and obtain information related to a track condition from the leading code word and the modifying code word. In other embodiments, a system may comprise a unit that is configured to both transmit and receive encoded electrical signals as indicated.

Another embodiment provides a method for generating a code for a railway track circuit. The method includes a step of transmitting through at least one rail of the railway a leading code word of an electrical signal, the leading code word of the electrical signal including both positive and negative DC pulses. The method further comprises, after a time interval of one code cycle, transmitting through the at least one rail a modifying code word of the electrical signal, which includes a sequence of DC pulses that invert the polarities of the DC pulses in the leading code word. The method further comprises receiving the electrical signal, confirming that the modifying code word of the signal inverts the polarities of the leading code word, and obtaining information related to a track condition from the leading code word and the modifying code word.

In yet another embodiment, a method is provided for electrically communicating a condition relating to a railway. The method comprises transmitting via the railway a timing pulse; waiting a data interval from transmitting the timing pulse, then transmitting via the railway a data pulse of a same polarity or an inverse polarity as the timing pulse; waiting a code cycle from transmitting the timing pulse, then transmitting via the railway a first modification pulse, wherein in case the data pulse was of same polarity as the timing pulse, then the first modification pulse is of same polarity as the timing pulse, or in case the data pulse was of inverse polarity as the timing pulse, then the first modification pulse is of same polarity as the data pulse; and waiting a second data interval from transmitting the first modification pulse, then transmitting via the railway a second modification pulse, wherein the second modification pulse is of same polarity as the timing pulse. The first and second data intervals and the polarity relationships among the pulses are indicative of the condition relating to the railway.

Another embodiment provides a system for electrically communicating via a railway. The system comprises a first unit configured for connection to at least one rail of a railway for transmitting electrical signals through the at least one rail. The first unit is configured to transmit through the rail at least one message selected from a first set of legacy messages consisting of DC pulses only of a first polarity, or from a second set of tandem messages, each tandem message comprising at least a leading code word and a modifying code word, the leading code word having a timing pulse and a data pulse of opposite polarity as the timing pulse, the modifying code word having a timing pulse of opposite polarity as the timing pulse of the leading code word and a data pulse of same polarity as the timing pulse of the leading code word.

BRIEF DESCRIPTION OF THE DRAWINGS

The present invention will be better understood from reading the following description of non-limiting embodiments, with reference to the attached drawings, wherein below:

FIG. 5 (comprising partial FIGS. 5A-5B) shows a flowchart schematic of a method for implementing the coding scheme shown in FIGS. 3 and 4.

DETAILED DESCRIPTION OF THE INVENTION

Reference will be made below in detail to exemplary embodiments of the invention, examples of which are illustrated in the accompanying drawings. Wherever possible, the same reference numerals used throughout the drawings refer to the same or like parts.

Figure 2:
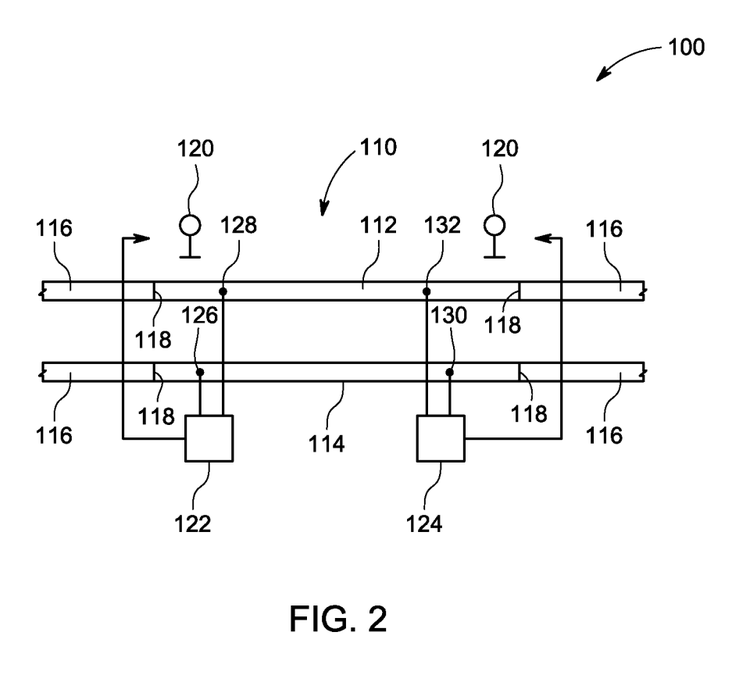
FIG. 2 is a schematic illustration of a railway code generation and signaling system according to a first embodiment of the invention.

FIG. 2 shows a railway code generation and signaling system 100 according to an embodiment of the invention is shown. As illustrated therein, the system 100 includes a track section 110 which is made up of two parallel rails 112, 114. The two rails 112, 114 of track block/section 110 are electrically insulated from rails 116 of the continuous track (i.e., other blocks) by insulators 118 (e.g., insulation joints). Disposed in the area of the insulators 118 are railway signaling systems, such as wayside indicators 120, that communicate information to and/or control track-bound rail vehicles traveling along the rails 112, 114, 116.

As further shown therein, the system 100 further includes a first unit 122 and a second unit 124 electrically connected to opposite ends of rails 112, 114 that define a track circuit extending between the rail terminals 126, 128 of the first unit 122 and rail terminals 130, 132 of the second unit 124. In an embodiment, the first and second units 122, 124 are transceivers configured to both transmit and receive electrical current and, in particular, coded electrical current, over at least one of the rails 112, 114. In an embodiment, one of the first and second units 122, 124 is a transmitter and the other of the first and second units 122, 124 is a receiver/relay.

Detailed implementation of the units 122, 124 will be apparent to the skilled worker. For example, U.S. Pat. No. 4,619,425 illustrates and generally describes an exemplary apparatus adaptable according to the further teachings of the instant description. U.S. Pat. No. 5,271,584, also, illustrates and generally describes a transceiver adaptable according to the further teachings of the instant description. The cited patents are hereby incorporated by reference except as might be expressly superseded by the instant description.

In operation, electrical current can be transmitted from one unit 122, 124 to the other unit 122, 124 at the opposite end of the track section 110 via signal pulses (electrical current that has been coded to carry signal information). This type of signal transmission, where signal pulses are transmitted in the form of electrical current pulses, is referred to as a bidirectional encoded track circuit. The first and second units 122, 124 are configured to generate both positive and negative DC pulses, according to a coding scheme that is indicative of a condition, as well as receive and analyze or relay the coded pulses. In particular, the electrical pulses transmitted by either of the units 122, 124 through at least one of the rails 112, 114 are received and evaluated by the other of the first and second unit 122, 124 to identify a message being transmitted. In some embodiments, positive pulses can be transmitted via one of the rails 112, 114 and negative pulses via the other of the rails 112, 114; in other embodiments, both positive and negative pulses can be transmitted concurrently on both of the rails 112, 114; in yet other embodiments, positive and negative pulses can be transmitted sequentially on one or both of the rails 112, 114. The DC pulses may be generated relative to a system ground, or across the rails 112, 114 (one rail being the negative rail and the other the positive rail).

In an embodiment, the condition may be the presence of a rail vehicle within the track block 110, a track condition ahead, speed restrictions, etc. In contrast to existing systems and coding schemes, the system of the present invention 100 adds negative pulses to a code protocol that relies on leading edge to leading edge (of a track block or section) timing to define vital codes. This is in contrast to other schemes which rely on a combination of short and long pulses to define vital codes.

As shown in FIG. 2, the units 122, 124 are electrically connected to the wayside indicators 120 and are configured to transmit information regarding one or more conditions thereto. As the units 122, 124 are configured to generate both positive and negative DC pulses, the number of potential codes that can safely communicate information to a wayside signal is increased. Accordingly, the railway code generation and signaling system 100 of the present invention is capable of communicating more information to wayside indicators or a central office than has been heretofore possible.

Although the system 100 is illustrated in FIG. 2 in relation to the track section 110, two units 122, 124, etc., the system can be characterized in a broader sense as comprising one of the units 122, which is configured for connection to at least one of the rails for transmission and/or reception of encoded electrical signals as set forth herein. In operation, the unit 122 is used in conjunction with another unit(s) 124 connected to the at least one of the rails at a spaced apart location, with at least one of the units transmitting the encoded electrical signals and at least one of the units receiving the encoded electrical signals.

As discussed above, conventional ("legacy") codes consist of single code words. Each code word in turn consists of a timing pulse and a data pulse, possibly separated by a data interval, which are transmitted within a defined time period ("code cycle"). While the timing pulse is of a fixed length, varying lengths of the data interval and of the data pulse determine the information content of the code word. The timing and data pulses of legacy code words are of a single polarity, and only the data pulse width and data interval provide structure and complexity necessary to ensure they are not random or the result of a failure. Legacy code words can be decoded singly. Under the legacy systems, different track blocks use inverted polarities in order to screen out code words that "leak" across the track block junctions (which, ideally, would be insulated against such leakage).

Figure 3:
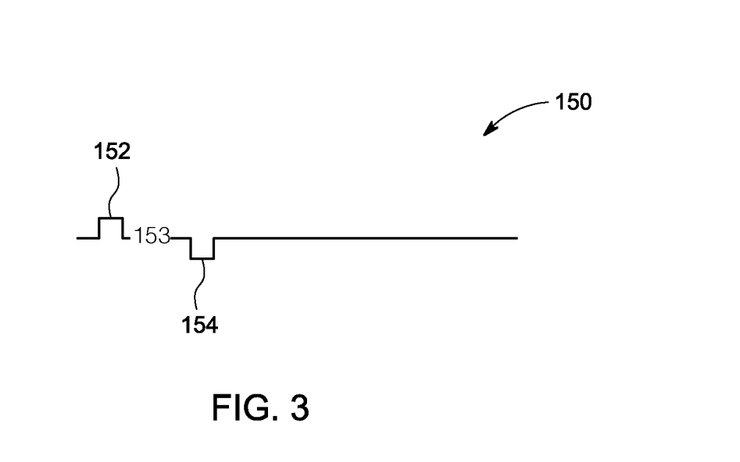
FIG. 3 illustrates a coding scheme featuring both positive and negative pulses on a DC track circuit generated by the railway code generation and signaling system of FIG. 2.
Figure 4:
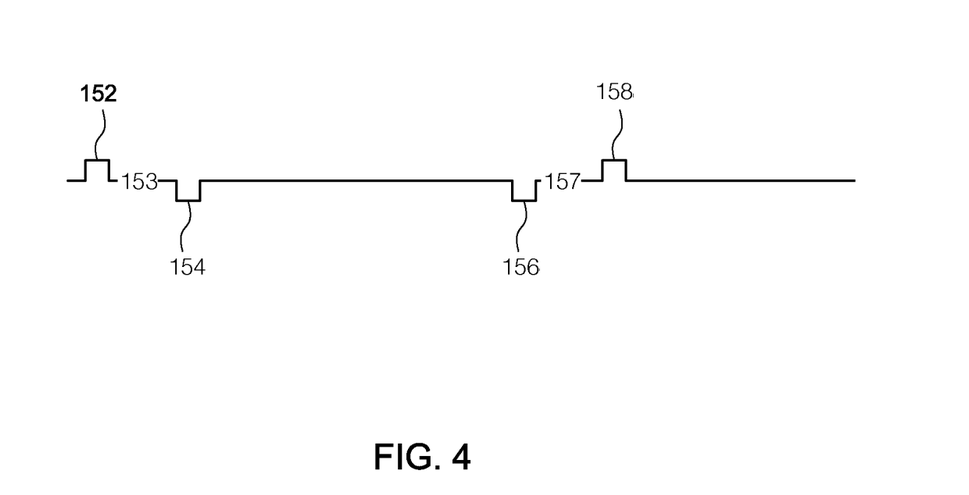
FIG. 4 illustrates positive and negative pulses on a transmission cycle of the coding scheme of FIG. 3.

By contrast, FIGS. 3-4 show an example of a coding scheme 150 that is generated by the code generation and signaling system 100 according to an embodiment of the present invention. The exemplary coding scheme 150 expands the possible codes into a tandem message paradigm. For backward compatibility with legacy systems, the exemplary coding scheme 150 includes all legacy code words, but also includes "tandem" messages that comprise at least two non-legacy code words. In each tandem message, a "leading" code word is altered from the legacy format so that it will not be interpreted as a valid legacy code, but instead will trigger a receiver to require a second or "modifying" code word before determining meaning and validity of the tandem message. The modifying code word cannot exactly duplicate the first code word (otherwise it might look like a recurrent system fault, e.g., simple leakage of timing pulses between adjacent track blocks), and cannot be the same as any legacy code word (this could present similar problem of appearing like track block leakage). The modifying code word both confirms validity of the leading code word, and completes the meaning of the tandem message.

In certain embodiments of the invention, such as the exemplary coding scheme 150, the leading code word is altered in that the data pulse polarity is inverted from the timing pulse polarity, thereby alerting the receiver to require a modifying code word in order to discern meaning. Each possible modifying code word would invert polarity sequence of the leading code word. In certain embodiments, the modifying code word simply would duplicate data interval and data pulse length of the leading code word. However, other modifying code words might include a different data interval and/or different data pulse length from the leading code word. Thus, as shown therein, the code generation and signaling system 100 of the present invention uses opposite polarity pulses and pattern restrictions to expand the number of available meanings, without changing the current capability. For example, a tandem message paradigm according to the exemplary coding scheme 150 might provide in two code cycles as many as $(n+n^2)$ messages including a set of n legacy code words.

In particular, as shown in FIG. 3 a leading code may include a short, positive DC timing pulse 152 and a short, negative DC data pulse 154 that follows the timing pulse 152 after a data interval 153. As will be readily appreciated, the code 150 has the same data interval as does the legacy code 30 shown in FIG. 1, but the second pulse 34 has been inverted. As under the inventive coding scheme the data pulse 154 can be positive or negative, thus the invention provides for two distinct meanings correlated to each value of the data interval 153.

Thus, through the select use of both positive and negative pulses (i.e., inverting one or more of the DC pulses), the number of possible codes can be increased. As such, additional information, such as speed restrictions, the presence of a rail vehicle, or track conditions ahead, etc., can be safely communicated through the track circuit using a tandem message paradigm. In particular, in an embodiment, positive pulses can provide the legacy code words, and negative pulses can be used in the expanded code set.

In connection with the above, it should be noted that a single negative pulse will not typically suffice to discriminate between leakage from an adjacent block versus intentional reversal of polarity. To allow discrimination between adjacent block leakage and intentional polarity reversal, polarity reversal patterns that cannot be created by adjacent block leakage are utilized.

When the system 100 sends a legacy code word (one with same polarity of both the timing pulse and the data pulse), then the modifying code word is sent with the same polarity as the signal code word. However, when sending a tandem message, the system 100 of the present invention utilizes a coding polarization scheme that can provide confirmation or enhanced information density ("modification") and that can be properly interpreted or rejected in the presence of leak-through from adjacent track blocks.

In some embodiments, modification is accomplished through polarity change sequence where the timing and sequence of the polarity changes has a specific interpretation. Polarization coding used to create the additional codes will be ignored in legacy signaling systems, where all pulses of a track block are of a same polarity (all positive or all negative); in the legacy systems, inverted polarity will be ignored, just as in the case of foreign signals leaked through from other track blocks. However, for a two-pulse code base that includes inverted pulses (a positive or negative timing pulse 152, followed after a data interval 153 by a data pulse 154 of the same or opposite polarity), according to embodiments of the invention, it can be difficult to assess whether two sequentially-received pulses of opposite polarity were meant to form a code word, or merely represent signal leakage among adjacent track blocks. By sending a modifying code word at a pre-determined code cycle timing after a signal code word, with a specific and intentional polarity reversal between corresponding pulses of the modifying code words, it is possible to validate that each code word comes from the same track block and has a specific meaning.

For example, FIG. 4 shows that leading timing pulse 152 and data pulse 154 can be reflected or modified by follow-up pulses 156, 158 of a modifying code word. Each follow-up or modifying timing pulse 156 and data pulse 158 is of inverse polarity to its respective leading pulse—i.e., the first modifying pulse 156. is negative-going whereas the leading timing pulse 152 is positive-going. The modifying pulses 156, 158 are separated by a second data interval 157. In certain embodiments, the second data interval 157 can be equal to the first data interval 153; i.e., the data interval can be preserved between the leading and the modifying code words, so that the modifying code word simply confirms the meaning of the tandem sequence. On the other hand, the modifying code word may have its pulses separated by a second data interval 157 that is distinct from the first data interval 153.

As will be appreciated, in certain embodiments the second data interval and the length of the second data pulse may differ from the first data interval and the length of the first data pulse, thereby expanding a variety of messages that can be encoded by the initial portion and the modification portion of the tandem signal. A particular pattern of polarity inversions, for example as shown in FIG. 4, then serves to distinguish the tandem signal from a legacy signal, and to confirm intentional variation of the data intervals.

Figure 5A:
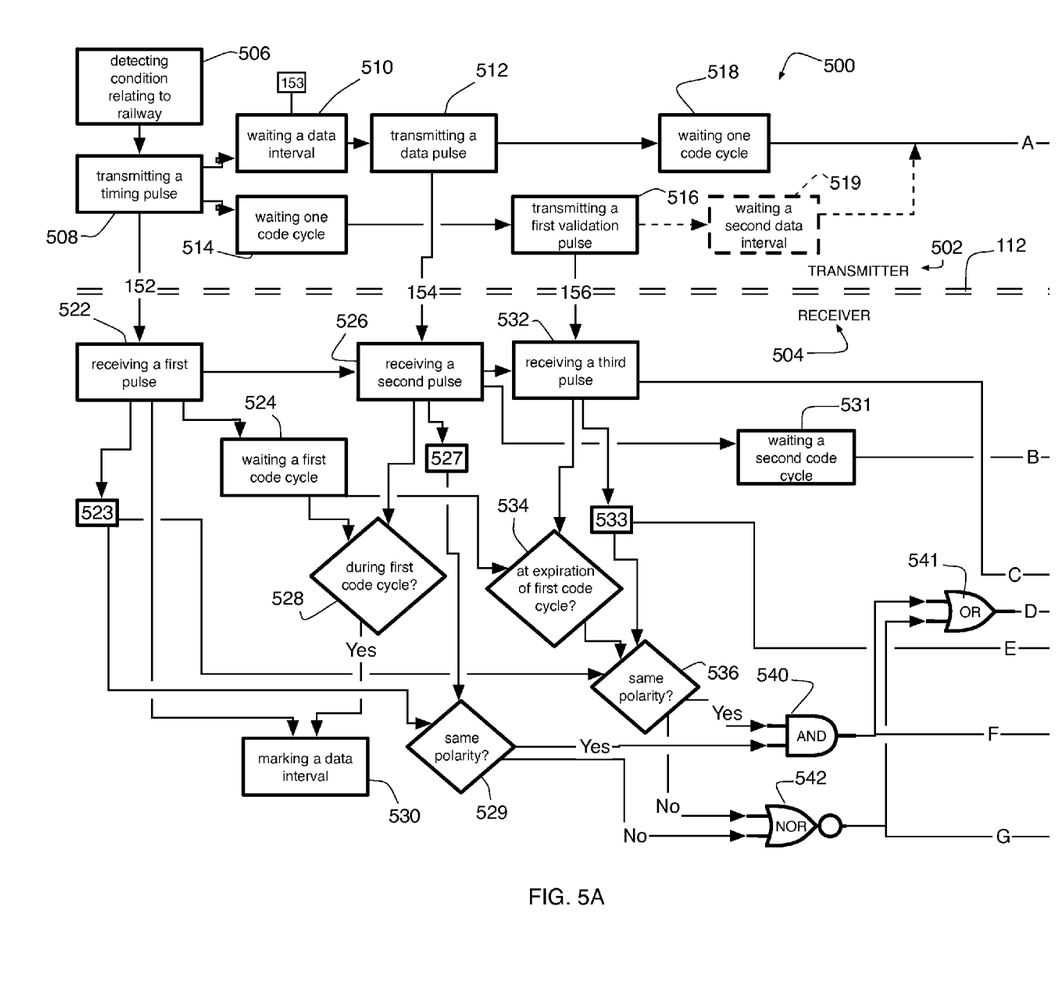
Figure 5B:
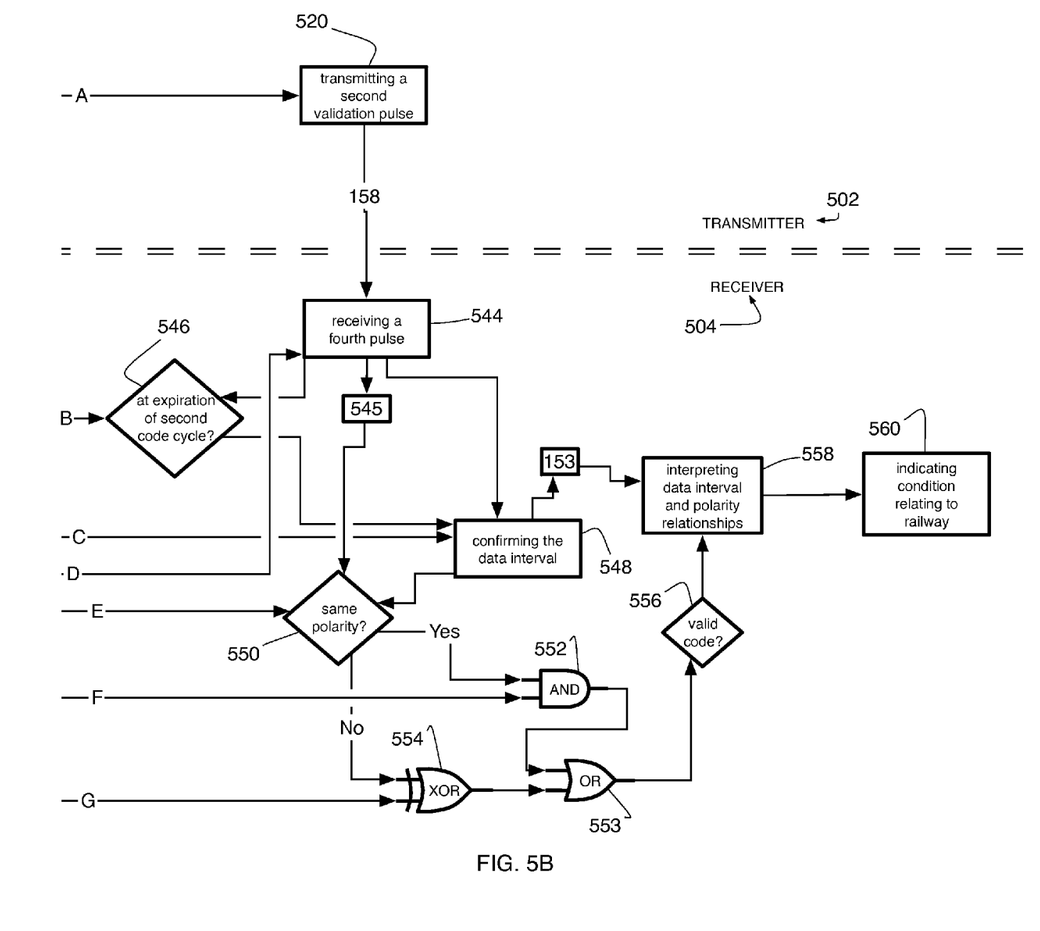

Thus, FIG. 5 shows steps of a method 500 for electrically communicating a condition relating to the railway 112, as implemented respectively by one of the units 122, 124 acting as a transmitter 502 and by the other of the units acting as a receiver 504.

According to the method 500, in response to detecting 506 a condition relating to the railway 112, the transmitter 502 transmits 508 the timing pulse 152. The transmitter 502 then waits 510 until the expiration of a transmit data interval 153 corresponding to the detected condition, before transmitting 512 the data pulse 154. Concurrently, the transmitter 502 waits 514 until the expiration of a pre-determined code cycle, before transmitting 516 the first modification pulse (second timing pulse) 156. As discussed above, in case the timing pulse 152 and the data pulse 154 are of a same polarity, the first modification pulse 156 also is of the same polarity as its respective timing pulse 152; on the other hand, in case the timing pulse 152 and the data pulse 154 are of opposite polarities, the first modification pulse 156 also is opposite polarity (invert) of the timing pulse 152. Also, after transmitting 512 the data pulse 154, the transmitter waits 518 another code cycle before transmitting 520 the second modification pulse (second data pulse) 158, which should always be the same polarity as the timing pulse 152. Alternatively, in embodiments in which the second data interval 157 can be different from the first data interval 153, then the transmitter waits 519 the second data interval 157 after transmitting the second timing pulse 156, before transmitting the second data pulse 158.

Meanwhile, the receiver 504 receives 522 a first pulse 523 corresponding to the timing pulse 152. In response to receiving the first pulse 523, the receiver 504 waits 524 one code cycle (a first receive code cycle). During the first receive code cycle, the receiver 504 may receive 526 a second pulse 527 corresponding to the data pulse 154. In case 528 the second pulse is received before expiration of the first receive code cycle, then the receiver 504 marks 530 a receive data interval, checks 529 whether the second pulse 527 is of same polarity as the first pulse 523, and also waits 531 a second receive code cycle. During the second receive code cycle, the receiver 504 may also receive 532 a third pulse 533 corresponding to the first modification pulse 156. In case 534 the third pulse 533 is received at expiration of the first receive code cycle, then the receiver 504 checks 536 whether the third pulse 533 is same polarity as the first pulse 523 (thereby setting a first validity flag). In case 540 the first, second, and third pulses all are of same polarity, or 541 in case 542 the second and third pulses are of opposite polarity from the first pulse, then the receiver 504 may also receive 544 a fourth pulse 545 that corresponds to the second modification pulse 158.

In case 546 the fourth pulse is received at expiration of the second receive code cycle, thereby confirming 548 the data interval 153, then the receiver 504 checks 550 whether the fourth pulse 545 is same or inverse polarity from the second pulse 527 (thereby setting a second validity flag). In case 552 the first, second, third, and fourth pulses all are same polarity, or 553 in case 554 the first and fourth pulses are same polarity while the second and third pulses are opposite polarity (both validity flags thereby being set), then the receiver 504 accepts 556 a valid code. The receiver 504 then interprets 558 (according to, e.g. a look up table) the receive data interval and the polarity relationships of the valid code. Finally, based on its interpretation of the valid code, the receiver 504 then indicates 560 the previously detected condition relating to the railway 112.

Thus, the inventive system 100 and algorithm 500 provide a code base that can include both legacy codes (all pulses of same polarity, one code word per message, data interval and data pulse length define message) and also modified codes, in which a message is defined by two tandem code words. In the modified codes of the inventive system and algorithm, a leading code word timing pulse of a first polarity is followed after a data interval (within a single code cycle) by a data pulse that is of opposite polarity, followed after the code cycle by the inverse of each pulse, such that the sequence of four pulses defining inverse polarities constitutes a different code from a legacy sequence of four pulses all of the same polarity and two pulses in each code cycle. All the legacy codes would be unchanged, but the pattern of the four pulses would be unique and different from the legacy 2×2 pulses. As will be readily appreciated, the railway code generation and signaling system 100 of the present invention thereby maintains backward compatibility, as it does not require any changes to the existing unipolar scheme. Legacy codes can be transmitted in the same way as always. Thus, the system 100 and the approach for generating more potential codes to communicate information is compatible with existing infrastructure and systems, requiring few additional parts or cost. As will be readily appreciated, the system 100 of the present invention allows railroads to increase velocity through more flexibility related to restrictions.

Thus, embodiments of the invention provide a system for electrically communicating a condition relating to a railway. The inventive system comprises a first unit connected to a first rail of the railway and configured to generate and transmit a code of positive and negative DC pulses through the rail; and a second unit connected to the first rail of the railway and spaced from the first unit and configured to sense the positive and negative DC pulses transmitted by the first unit. The code transmitted by the first unit includes a data code word followed by a modifying code word. The data code word consists of a positive or negative timing pulse followed after a data interval by a positive or negative data pulse. The modifying code word consists of a second positive or negative timing pulse followed after a second data interval by a second positive or negative data pulse. The second positive or negative timing pulse starts after a time delay of one code cycle from the start of the timing pulse of the data code word. The second timing pulse and the second data pulse are duplicates of the timing pulse and the data pulse in case the timing pulse and the data pulse are of a same polarity, but are inverts of the timing pulse and the data pulse in case the timing pulse and the data pulse are of an opposite polarity. In certain embodiments, the second data interval differs from the first data interval. In certain embodiments of the system, the first and second units are transceivers each having transmit and receive modes. The system may further comprise a wayside indicator in communication with the second unit. The second unit may be configured to evaluate the data code word of the code, which may communicate the condition relating to the railway. For example, the condition may include any of: the presence of a rail vehicle within a track block of the railway; an upcoming track condition; or a speed restriction. In certain embodiments, the negative and/or positive pulses are approximately 112 milliseconds long, and the code cycle is approximately 2.8 seconds. In certain embodiments, the data interval varies from zero milliseconds to 448 milliseconds.

Thus, aspects of the invention provide a method for electrically communicating via a railway. The method comprises impressing onto a rail of the railway a data code word of an electrical signal, the data code word of the electrical signal including both positive and negative DC pulses; after a time interval of one code cycle, impressing onto the rail a modifying code word of the electrical signal, the modifying code word of the electrical signal including a sequence of DC pulses that invert the polarities of the DC pulses in the leading code word; and receiving the electrical signal. The method further comprises confirming the modifying code word of the signal is of inverse polarity from the data code word; and interpreting the leading code word of the signal to obtain information related to a track condition. In certain aspects, the step of impressing may be carried out by a transmitter at one end of a railway track circuit; the step of receiving may be carried out by a receiver at the other end of the railway track circuit. In some aspects, the method further comprises, after confirming the modifying code word of the signal, controlling a wayside indicator based on the information related to the track condition.

Other aspects of the invention provide another method for electrically communicating a condition relating to a railway, which comprises transmitting via the railway a timing pulse; waiting a data interval from transmitting the timing pulse, then transmitting via the railway a data pulse of the same or inverse polarity as the timing pulse; waiting a code cycle from transmitting the timing pulse, then transmitting via the railway a first modification pulse, wherein in case the data pulse was of same polarity as the timing pulse, then the first modification pulse is of same polarity as the timing pulse, or in case the data pulse was of inverse polarity as the timing pulse, then the first modification pulse is of same polarity as the data pulse; and waiting a second data interval from transmitting the first modification pulse, then transmitting via the railway a second modification pulse, wherein the second modification pulse is of same polarity as the timing pulse, wherein the first and second data intervals and the polarity relationships among the pulses are indicative of the condition relating to the railway. In certain aspects, the method further comprises in response to receipt of a first pulse, waiting a first code cycle; in response to receipt of a second pulse, before expiration of the first code cycle, marking a data interval and waiting a second code cycle; in response to receipt of a third pulse, of inverse polarity to the first pulse and at expiration of the first code cycle, setting a first validity flag; in response to receipt of a fourth pulse, of inverse polarity to the second pulse and at expiration of the second code cycle, setting a second validity flag; and in response to the first and second validity flags being set, interpreting the data interval and a polarity relationship of the first and second pulses to indicate the condition relating to the railway.

In another embodiment, a method comprises transmitting through a rail of a railway a leading code word comprising a first positive DC or negative DC timing pulse followed after a first data interval by a first positive DC or negative DC data pulse. The method further comprises transmitting through the rail, after the leading code word, a modifying code word. The modifying code word comprises a second positive DC or negative DC timing pulse followed after a second data interval by a second positive DC or negative DC data pulse, the second positive or negative timing pulse starting after a time delay of one code cycle from the start of the first timing pulse of the leading code word. In case the first timing pulse and the first data pulse are of a same polarity then the second data interval and the second data pulse are duplicates of the first data interval and the first data pulse. In case the first timing pulse and the first data pulse are of a opposite polarity then the second timing pulse and the second data pulse are inverts of the first timing pulse and the first data pulse.

Another embodiment provides a system for electrically communicating via a railway. The system comprises a first unit configured for connection to at least one rail of a railway for transmitting electrical signals through the at least one rail. The first unit is configured to transmit through the rail at least one message selected from a first set of legacy messages consisting of DC pulses only of a first polarity, or from a second set of tandem messages, each tandem message comprising at least a leading code word and a modifying code word, the leading code word having a timing pulse and a data pulse of opposite polarity as the timing pulse, the modifying code word having a timing pulse of opposite polarity as the timing pulse of the leading code word and a data pulse of same polarity as the timing pulse of the leading code word.

Another embodiment relates to a method for electrically communicating via a railway, which comprises the steps of: transmitting through at least one rail of the railway a leading code word of an electrical signal, the leading code word of the electrical signal including both positive and negative DC pulses; after a time interval of one code cycle, transmitting through the at least one rail a modifying code word of the electrical signal, the modifying code word of the electrical signal including a sequence of DC pulses that invert the polarities of the DC pulses in the leading code word; receiving the electrical signal; confirming the modifying code word of the signal inverts the polarities of the leading code word; and obtaining information related to a track condition from the leading code word and the modifying code word.

In another embodiment of the method, the steps of transmitting are carried out by a transmitter at one end of a railway track circuit, and the step of receiving is carried out by a receiver at the other end of the railway track circuit.

In another embodiment, the method further comprises the step of, after confirming the modifying code word of the signal, controlling a wayside indicator based on the information related to the track condition.

In another embodiment, a method for electrically communicating a condition relating to a railway comprises: transmitting via the railway a timing pulse; waiting a data interval from transmitting the timing pulse, then transmitting via the railway a data pulse of a same polarity or an inverse polarity as the timing pulse; waiting a code cycle from transmitting the timing pulse, then transmitting via the railway a first modification pulse, wherein in case the data pulse was of same polarity as the timing pulse, then the first modification pulse is of same polarity as the timing pulse, or in case the data pulse was of inverse polarity as the timing pulse, then the first modification pulse is of same polarity as the data pulse; and waiting a second data interval from transmitting the first modification pulse, then transmitting via the railway a second modification pulse, wherein the second modification pulse is of same polarity as the timing pulse, wherein the first and second data intervals and the polarity relationships among the pulses are indicative of the condition relating to the railway.

In another embodiment, the method further comprises, in response to receipt of a first pulse, waiting a first code cycle; in response to receipt of a second pulse, before expiration of the first code cycle, marking a data interval and waiting a second code cycle; in response to receipt of a third pulse, of inverse polarity to the first pulse and at expiration of the first code cycle, setting a first validity flag; in response to receipt of a fourth pulse, of inverse polarity to the second pulse and at expiration of the second code cycle, setting a second validity flag; and in response to the first and second validity flags being set, interpreting the data interval and a polarity relationship of the first and second pulses to identify the condition relating to the railway.

In another embodiment of the method, a first unit transmits the pulses at a first end of the railway, and a second unit receives the pulses at a second end of the railway.

In another embodiment, the method further comprises actuating an indicator to indicate the condition relating to the railway.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the railway code generation and signaling system and method, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A system comprising:
    a track section, which is made up of two parallel rails,
    a first unit configured for connection to at least one rail of the track section and further configured to generate and transmit a tandem message of positive and negative DC pulses through the at least one rail for reception by a spaced-apart second unit connected to the at least one rail;
    wherein the first unit is configured to transmit the tandem message as comprising a leading code word followed by a modifying code word, the modifying word being required by the second unit for confirming validity of the leading code word and for completing the meaning of the tandem message,
    the leading code word comprises a first positive or negative timing pulse followed after a first data interval by a first positive or negative data pulse, the modifying code word comprises a second positive or negative timing pulse followed after a second data interval by a second positive or negative data pulse,
    the second positive or negative timing pulse starting after a time delay of one code cycle from the start of the first timing pulse of the leading code word,
    in case the first timing pulse and the first data pulse are of a same polarity then the second data interval and the second data pulse are duplicates of the first data interval and the first data pulse, and
    in case the first timing pulse and the first data pulse are of an opposite polarity then the second timing pulse and the second data pulse are of opposite polarities from, respectively, the first timing pulse and the first data pulse
    the second unit is able to validate that each tandem message comes from the same track section and to read the meaning of each tandem message on the basis of the time delay of the code cycle and of the polarities of the second timing pulse and of the second data pulse.

2. The system of claim 1, wherein: the second data interval differs from the first data interval.

3. The system of claim 1, wherein: the first unit is a transceiver having a transmit mode for transmitting the code to the second unit and a receive mode for receiving codes from the second unit.

4. The system of claim 1, further comprising: the second unit, wherein the code received by the second unit contains information about a condition relating to the railway; and a wayside indicator in communication with the second unit, wherein the second unit is configured to generate signals for controlling the wayside indicator based at least in part on the condition relating to the railway.

5. The system of claim 1, further comprising: the second unit, wherein the second unit is configured to evaluate the leading code word of the code.

6. The system of claim 5, wherein: the leading code word communicates a condition relating to the railway.

7. The system of claim 6, wherein: the condition is at least one of a presence of a rail vehicle within a track block of the railway, an upcoming track condition, or a speed restriction.

8. The system of claim 1, wherein: the code consists of the leading code word followed by the modifying code word, the leading code word consists of the first positive or negative timing pulse followed after the first data interval by the first positive or negative data pulse, and the modifying code word consists of the second positive or negative timing pulse followed after the second data interval by the second positive or negative data pulse.

9. The system of claim 1, wherein: the code cycle is approximately 2.8 seconds.

10. A system comprising:
a track section, which is made up of two parallel rails,
a first unit configured for connection to at least one rail of the track section and further configured to transmit through the at least one rail a leading code word of an electrical signal, the leading code word of the electrical signal including both positive and negative DC pulses;
wherein the first unit is further configured, after a time interval of one code cycle, to transmit through the at least one rail a modifying code word of the electrical signal, the modifying code word of the electrical signal including a sequence of DC pulses that invert the polarities of the DC pulses in the leading code word, the modifying code word being required for confirming the validity of the leading code word; and
a second unit configured for connection to the at least one rail and further configured to receive the electrical signal, confirm that the modifying code word of the signal inverts the polarities of the leading code word, and obtain information related to a track condition from the leading code word and the modifying code word
the second unit being able to validate that each electrical signal comes from the same track section and to read the meaning of each electrical signal on the basis of the time interval of the code cycle.

11. A system comprising:
a track section, which is made up of two parallel rails,
a first unit configured for connection to at least one rail of the track section for transmitting electrical signals through the at least one rail,
wherein the first unit is configured to transmit through the rail at least one message selected from a first set of legacy messages consisting of DC pulses only of a first polarity, or from a second set of tandem messages, for reception by a spaced-apart second unit connected to the at least one rail,
each tandem message comprising at least a leading code word and a modifying code word, the leading code word having a timing pulse and a data pulse of opposite polarity as the timing pulse, the modifying code word having a timing pulse of opposite polarity as the timing pulse of the leading code word and a data pulse of same polarity as the timing pulse of the leading code word,
the timing pulse of the modifying code word starting after a time delay of one code cycle from the start of the timing pulse of the leading code word,
the modifying code word being required by the second unit for confirming validity of the leading code word and for completing the meaning of the tandem message,
the second unit is able to validate that each tandem message comes from the same track section and to read the meaning of each tandem message on the basis of the time delay of the code cycle and of the polarities of the timing pulse and of the data pulse of the modifying code word.

12. The system as claimed in claim 11, wherein the timing pulse and the data pulse of the leading code word define a first data interval, the timing pulse and the data pulse of the modifying code word define a second data interval, and the tandem message encodes data in a similarity or a difference of the first and second data intervals.

* * * * *